June 1, 1971 D. J. DINSMORE Re. 27,135

READILY REMOVABLE DOUBLE HUNG WINDOW

Original Filed Jan. 28, 1966 2 Sheets-Sheet 1

INVENTOR.
DAWSON J. DINSMORE
BY Schroeder, Siegfried & Ryan
ATTORNEYS

READILY REMOVABLE DOUBLE HUNG WINDOW

Original Filed Jan. 28, 1966 2 Sheets-Sheet 2

INVENTOR.
DAWSON J. DINSMORE
BY Schroeder, Siegfried & Ryan
ATTORNEYS

United States Patent Office

Re. 27,135
Reissued June 1, 1971

27,135

READILY REMOVABLE DOUBLE HUNG WINDOW

Dawson J. Dinsmore, deceased, late of Sioux Falls, S. Dak., by Thomas J. Barron, executor, Sioux Falls, S. Dak., assignor to D. J. Dinsmore Co., Sioux Falls, S. Dak.

Original No. 3,358,404, dated Dec. 19, 1967, Ser. No. 523,784, Jan. 28, 1966. Application for reissue Dec. 8, 1969, Ser. No. 870,317
Int. Cl. E05d *13/12;* E06b *3/44*
U.S. Cl. 49—446 9 Claims

Matter enclosed in heavy brackets [ ] appears in the original patent but forms no part of this reissue specification; matter printed in italics indicates the additions made by reissue.

*ABSTRACT OF THE DISCLOSURE*

*A readily removable window in which the balance assembly for the sash slides with the same and in which the balance assemblies are retained on the [jamb] through the use of an adjustable stop mechanism to permit the sash to be slidably displaced in the frame and removed therefrom.*

This invention relates to [double hung] windows with balance assemblies and more particularly to an improved window of this type in which the sash of the same are readily removable from the window casing.

*Removable* [Double hung] windows with balance assemblies are well known and in use. The problem of making the sash of such windows readily removable from the window casing in a manner similar to the single hung window has not been satisfactorily solved. Where such units have both sash of the removable type, complex and expensive window structures have been required. Further such windows have not been capable of full ranges of movement in the manner of the conventional *removable* [double hung] window.

The present invention is directed to a simplified and improved design of a [double hung] *removable* window which incorporates a balance assembly and in which [both] *the* sash [are] *is* readily removable. In addition, such sash will operate over [their] *its* entire range of movement and the sash may be simply and rapidly removed and installed without special tooling or the like.

Therefore, it is the principal object of this invention to provide an improved [double hung] *removable* window with balance assembly.

Another object of this invention is to provide in a window of this type features which make both sash of the window readily removable.

Another object of this invention is to provide a readily removable [double hung] window with balance assembly which is simple in design, low in cost and easy to maintain.

These and other objects of this invention will become apparent from a reading of the attached description together with the drawings wherein.

Figure 1:
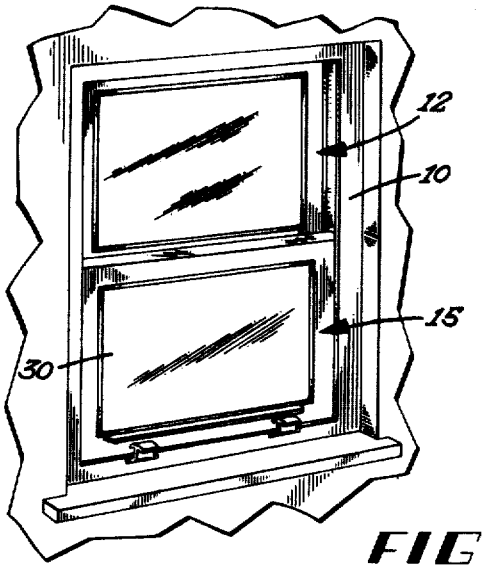
FIG. 1 is a perspective view of a window incorporating the improved readily removable [double hung] window *with* balance assembly *applied to a double hung window.*
Figure 5:
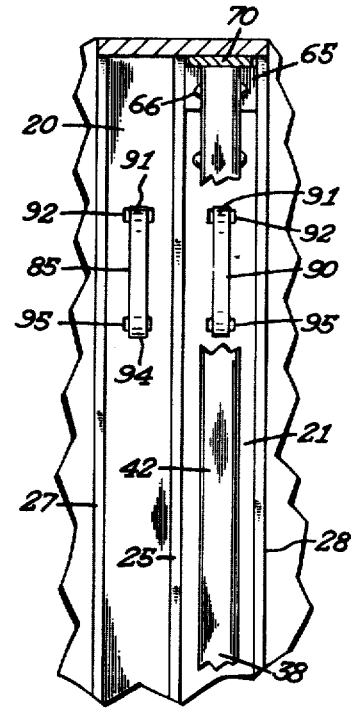
FIG. 5 is a sectional view of the window casing of FIG. 2 taken along the lines 5—5 therein.
Figure 5:
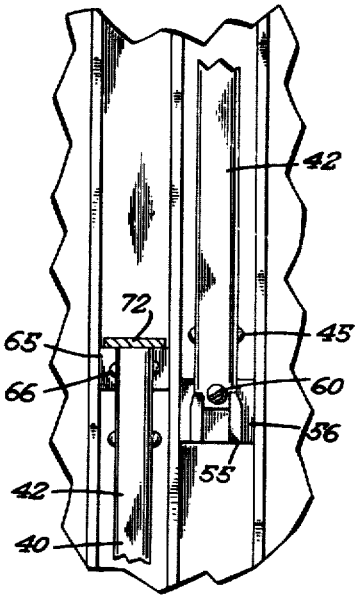
Figure 6:
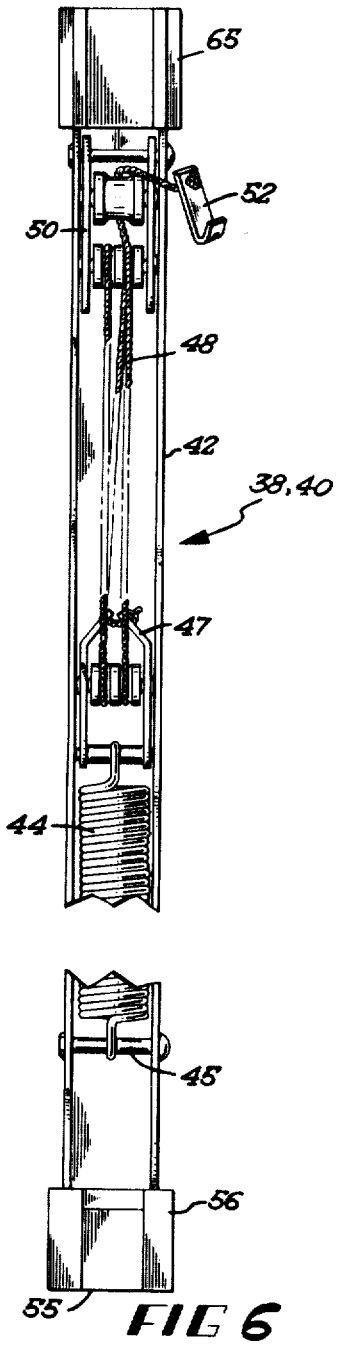
FIG. 6 is a rear elevation view of a balance unit for my improved [double hung] *removable* window.

My invention in a [double hung] *removable* window is particularly adaptable to the preformed prehung type which may be of metallic or wood construction. In FIG. 1, such a window unit is shown in perspective as including a window casing 10 mounting an upper and lower sash unit 12 and 15, respectively, which sash units are mounting in the casing in separate jamb channels indicated at 20 and 21, respectively (see FIG. 5). These jamb channels extend the full height of the window casing to permit a full range of movement of the sash units 12 and 15 therein. The jamb channels are divided by means of a centrally located divider ridge 25 and defined by the side flanges or lintels 27, 28 formed integral with the window casing or attached thereto to permit sliding of the sash in the channels 20, 21. For simplicity, details of the weather stripping and mounting structure for the same are omitted since these form no part of the present invention. The sash 12 and 15 are substantially identical in construction and are comprised basically of a frame surrounding a window pane, such as is indicated at 30, and suitably attached thereto. The sash frame has grooved side edges defined by lintel portions 32 extending along the edges of the same to define a recess 35 or groove in the side edges of the sash such that the sash will enclose the balance units, to be later described, associated therewith. Each of the sash are adapted to be positioned in the respective channels 20, 21 and between the central dividing flange and the side lintels 27, 28 respectively such that the sash will be slidably mounted therein in a conventional manner. Such structure is conventional with preformed or prehung windows particularly of the metallic construction.

Each of the sash 12 and 15 have associated therewith balance units along the sides of the same, the balance unit being indicated at 38 for the upper channel and 40 for the lower sash. Such units are identical in construction and are generally conventional. Thus, only the construction of a single balance unit will be described, it being understood that all balance units for each of the sash will be the same. Each balance unit includes an elongated U-shaped channel member 42 having mounted therein a coil spring 44 which is secured at one extremity to the channel unit through a pin 45. The free end of the spring mounts a floating anchor 47 and a sash cord 48 with the opposite extremity of the channel member mounting a fixed anchor 50. Each of the anchors have grooved rollers therein and the sash cord extends around the same in a compound pulley system with the free end of the sash cord being connected to a hook 52 adapted to be secured in an appropriate notch in the side jamb of the window casing. One extremity of the elongated channel member 42 mounts a guide block 55 having a flange part 56 on one surface thereof adapted to engage and slide along the jamb surface with the opposite edge of the block 55 being tapered as at 58 to provide a cam surface for the purpose of centering the window. The block 55 is preferably made of a plastic or nylon material and is secured to the channel through a suitable screw means, indicated at 60. The opposite extremity of the channel member mounts a second guide block 65 having a surface adapted to engage the jamb to facilitate sliding of the balance unit thereon and recess or notch 66 in the exposed end of the same adapted to be engaged by a removable stop member, to be later defined. The guide block 65 is secured to the channel member through a pin 68. Each of the balance units 38 and 40 for each side of the sash are of the same length and extend substantially the full length of the sash and are adapted to move therewith in a biasing and balancing action of the sash. The individual sash 12 and 15 each have flange members 70 and 72 respectively positioned at the upper edges of either side of the sash to engage the balance units. Similarly the cam surfaces 58 of a guide block 55 in the end of each of the balance units 38 and 40 engage the grooved or recessed surface 35 in the sides of the sash for the purpose of centering the respective sash in the window casing. The balancing action imparted by the balance unit will then be applied to both top and bottom of the sash as the sash is moved up and down in their respective channels.

Figure 2:
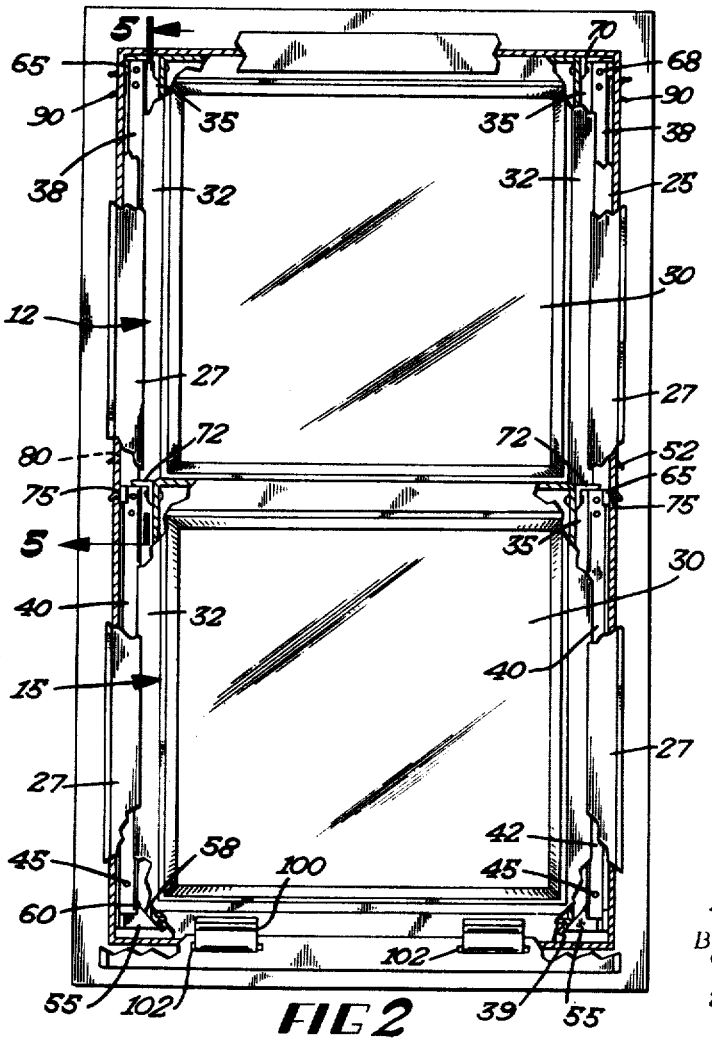
FIG. 2 is a front elevation view of the [double hung] *removable* window of FIG. 1 with parts broken away.

As will be seen in FIG. 2, the ends of the sash cords for the balance units of the lower sash positioned in the jamb channel 20 on either side of the same are connected through slots 75 in the side, jambs with the sash cord extending to the opposite end of the elongated channel member and over the pulley system to be in a maximum biased position when the lower sash is in the closed position. Similarly the upper balance units 38 for the upper sash have their respective hook members 52 attached in slots 80 positioned adjacent the lower end of the upper sash in the raised position. Thus, the slots 75 and 80 appear substantially midway along the extent of the respective jamb channels such that the upper sash will normally be unbiased in the closed position while the lower sash is biased in the closed position.

Figure 3:
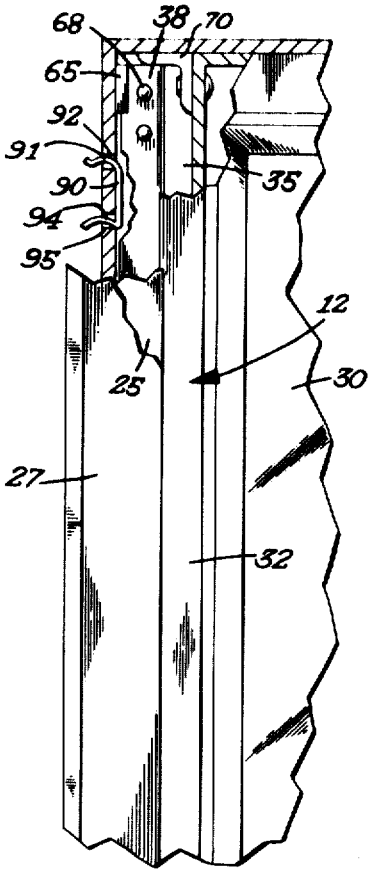
FIG. 3 is an elevation view of a portion of the window of FIG. 2 showing an adjustable stop in a retracted position.
Figure 3:
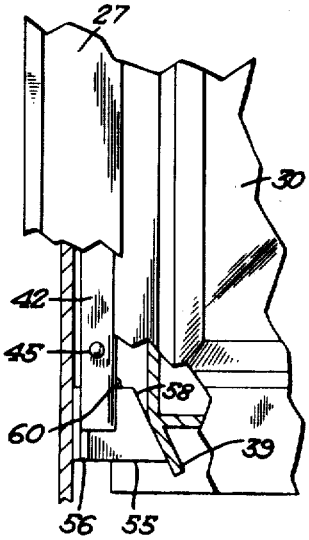

Also positioned in each of the jamb channels are releasable stop members indicated at 85 and 90 respectively. As will be seen in FIG. 5, these stop members are positioned at the same height or elevation along the window casing in the separate jamb channels 20, 21 and near the top edge of the jamb channels as will be seen in FIG. 2. The stop members are formed by a narrow metallic strip having a bend 91 at one extremity and inserted through a slot 92 in the jamb channel with a curved shape bend 94 at the other extremity inserted through a second slot 95 spaced below the slot 92. Since each of the stop members are identical in construction, only one will be described. Intermediate the bends, the stop members are straight such as to be disposed flush with the jamb surface overlying the same and parallel thereto to be out of the way and present no obstruction to passage of the balance units above the same. As will be seen in FIGS. 3 and 4 the lower end of the stop members may be raised or pulled outwardly by a suitable tool, such as a screwdriver to project into the path of travel of the balance unit with the sash to engage the extremity of the same carrying the guide member 65. This raised projection will fit into the recess 66 in the end of the flange member to prevent further movement of the same for the purpose to be later defined. Similar stop members are included on either side of the sash near the upper ends of the window casings in the respective jamb channels for the purpose of engaging the balance units 38, 40 *respectively* associated therewith.

In normal usage, the removable or releasable stop members 85, 90 are both retracted so as not to engage the respective balance units as they move with the respective sash in the jamb channels 20, 21. Thus under the condition of normal usage, the lower sash with its balance units 40 having their sash cord attached or secured to the jambs in the apertures 75 therein adjacent the top of the sash in closed position will be fully biased. The top of the balance unit will engage the projecting flange extremity 70 on either side of the sash and the lower end of the balance unit or the guide member 55 therein as its cam surfaces 58 will engage a curved or bevelled surface in the side of the sash, indicated at 39 in FIGS. 3 and 4. Such camming action on either side of the sash will center the same in the window casing and the bias force from the extended tension spring in the balance unit, which through its sash cord is secured ot the jamb channels, will apply a bias force to the sash at the flange extremity 70 of the same and the bevelled surface 39 of the same urging the same upward from the closed position. As will be seen in FIG. 2, suitable means may be utilized to retain the lower cash in a biased position, such as the lifts 100 having a flange part (not shown) which fits into slots 102 in the lower window portion of the window casing. When released, the lower sash will move in the jamb channel 20 up the same along the extent of the window casing and will not engage the releasable stop member 85, being thereby permitted to move to the fully open position. The bias action applied to the balance units 40 will permit them to follow along with the sash 15 in the upward and downward movement of the same. As the window moves down, balance tension is increased on the window.

The upper sash 12 is similarly associated with its balance unit 38 having the flange parts at the upper edges of the same and bevelled surfaces 39 at the lower extremities of the sash which engage the camming surface 58 of the guide members 50 therein. The guide members 55 and 65 are preferably made of a nylon material to facilitate sliding of the balance unit on the jamb surface and the flange portion 56 at the lower edge of the same extends substantially the width of the channels to guide the balance unit therein. The upper sash has its balance units 38 connected in an unbiased position for the closed upper position of this window with the sash cord being connected at its hook end through the aperture 80 in the jamb channel 21. Thus the upper sash will be biased as it is moved to an open or lowered position providing the balancing force for closing the same. The releasable or retractable stop member 90 in the channel 21 will normally be positioned against the jamb surface so as not to obstruct travel of the balance units 38 in the closing direction.

Figure 4:
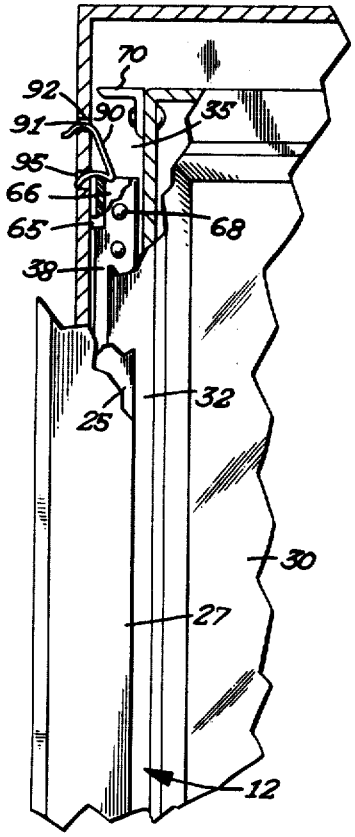
FIG. 4 is an elevation view of a portion of the window shown in FIG. 2 with the retractable stop in an engaged position.
Figure 4:
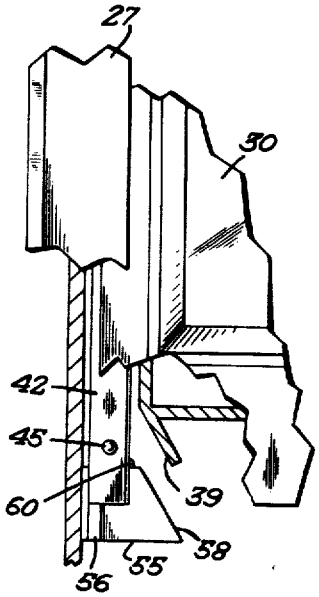

When it is desired to remove the respective sash 12 and 15 from the window casing, the removable stop members 85 and 90 are moved from a position flush against the jamb surface to a projecting position such as is shown in FIG. 4. In the case of the lower sash, the balance units 40 associated therewith at the sides of the same will move up the respective jamb channels with the sash until the stop members 85 are engaged. At this point, the balance units will be restrained from moving further and the flanges 70 at the top edges of the roller sash will move away from the end of the balance unit as will the cam or bevelled surface 39 at the lower edge of the sash in the groove 35 thereof from the guide block 55 at the opposite end of the balance unit. This will release the sash 15 from the balance unit, such that it may move translationally or sideways in the jamb channel away from the centered position with respect to the window casing. The physical size of the lintel edges 32 on the sides of the sash and the length of the flanges or lintels 27 on the casing are such as to permit one edge of the window to move away from restrained or engaged position in the jamb channel 20 on one side of the window and the window to be pulled out away from the window casing. It will be noted that the sash will not have reached the full elevation or open position before the balance unit is released therefrom and that, short of the full open position the sash will be free for such translational movement and removal from the window casing.

The upper sash is similarly removed from the window casing by first lowering the sash beyond the movable stop members 90 in the jamb channel 21. After the stop members have been projected into the jamb channel 21, the sash is again raised and the upper balance units 38 to the sides thereof are engaged by the respective stop members 90 to prevent further movement of the same. In the same manner, the upper flanges 70 will be displaced from the ends of the balance units 38 and the lower ends of the upper sash will move away from the respective bevelled surfaces in the grooves on the side edges of the upper sash to release the upper sash from the guide blocks 55 of the upper balance units. Thus the upper sash will be free for translational movement as the sash is moved beyond the stop member 90 a predetermined distance after which the sash may be moved translationally in the jamb channel 21 until the lintel edges of the sash are free of the flange 25 such that the sash may be moved out of the window casing.

In this improved double hung window with balance assemblies provision is made for balancing both upper and lower sash such that the movement of the windows are appropriately balanced. In addition, the upper and lower sash are made readily removable by the provision of retractable stop members in the jamb channels in which the respective sash slides so that the balance units associated with the sash may be removed therefrom and the sash moved translationally to release the same from the window casing. This simplified arrangement of parts provide for properly and accurately centering the window within the window casing, balancing the same and requires no external means or tools or disassembly for sash removal. It further employs a slightly modified balance unit which is removable from cooperating connection with the sash such that the balance unit will be retained on the jamb casing as the window is removed. Installation of the windows is readily accomplished by insertion of the window at substantially the same elevation as they were removed and urging the respective sash down in the jamb channels until the balance units are engaged. Further movement will release the balance units from the retractable stop members such that they may be deflected into the jamb casing so as to impede further movement of balance with the sash in the operation of the window.

In considering this invention it is intended that the present disclosure be illustrative only and the scope of the invention should be determined by the appended claims.

What is claimed is:

1. A readily removable [double hung] window with balance assembly comprising: a window casing having a [pair of] jamb [channels] *channel* along the sides of the same extending the height of the casing, a [pair of] sash slidably mounted in the jamb [channels] *channel,* [each of] said sash having grooved side edges with flange means at one end of the same, a balance unit for [each of] said sash [members] adapted to be positioned between the sash and the jamb [channels] *channel* for the window casing, [each of] said balance [units] *unit* being comprised of an elongated channel member having a bias means mounted therein and a sash cord connected thereto and biased by the bias means with the free extremely of the sash cord extending through the open face of the channel and terminating in a hook, said balance [units] *unit* being [respectively] positioned in the [side jambs] *jamb* [of the channels] *channel* in the window casing such that the grooved side [edges] *edge* of the sash [fit] *fits* around the [respective] balance unit and such that the hook of the sash [cords] *cord* of the balance [units] *unit* [are] *is* connected into *a* [slots] *slot* in the [side] jamb *channel* and said balance [units] *unit* [are] *is* movable with the [sashes] *sash* as [they] *it* [slide] *slides* in the jamb channel through engagement of one extremity of the [respective] balance unit with the flange means on the sash, and releasable stop means included in [each of] the [side] jamb [channels] *channel* [near the upper extremity of the height of the casing], said releasable stop means being adapted in one position to engage the [respective] balance [units] *unit* as [they] *it* [move] *moves* with the sash to move beyond the stop means to free the balance unit from the sash such that thereafter the sash can be moved translationally in the jamb channel to remove the same from the window casing.

2. The readily removable [double hung windows] *window* with balance assembly of claim 1 in which the releasable stop means is a flange pivotally mounted in the [side] jamb [of each] channel [near the upper extremity of the same] which flange is adapted to be pivoted from a projecting position into the path of travel of the balance unit to a position parallel to the surface of the jamb *channel* where the balance unit is slidable thereon.

3. The readily removable [double hung windows] *window* with balance assembly of claim 2 in which [each of] the balance [units] *unit* having the elongated channel member *includes* [include] a tension spring attached at one extremity to the elongated channel *member* with the opposite extremity being connected to a sash cord and extending over and through a compound pulley system.

4. The readily removable [double hung] window with balance assembly of claim 3 *in which a balance unit is positioned on each side of the slidably mounted sash,* and including a guide member positioned at the end of each of the elongated [channels] *channel members* of the balance units *and* connected thereto projecting outwardly therefrom and beyond the back of the elongated channel [unit] *member* to engage the grooved extremity of the sash opposite the flange [end] *means* of the same to aid in guiding and moving the [window] *sash* under the bias of the balance unit.

5. The readily removable [double hung] window with balance assembly of claim 4 in which the guide member has a cammed surface thereon which engages the grooved surface of the sash to center the sash in the jamb channels translationally.

6. The readily removable [double hung windows] *window* with balance assembly of claim 5 in which the sash cords of each of the balance units are adapted to be hooked into slots positioned in the window casing in the [respective] jamb [channels] *channel* intermediate the height of the casing and in which the removable stop means for each [of the channels] are *balance unit is* located at [substantially] the same height in the [respective] jamb channels for [each] *said* sash [member].

7. The readily removable [double hung] window with balance assembly of claim 6 *in which the window is a double hung unit with a pair of sash slidably mounted in the window casing in separate spaced apart jamb channels, and* in which the lower window sash in the window casing is associated with [a] balance *units* [unit] *each* having its sash cord connected in a slot in the associated side jamb channel slightly less than midway along the height of the window casing with [the] *each* balance unit being so positioned that the sash cord is tensioned by the associated spring to a maximum with the lower window *sash* closed to permit ease in [opening] *sliding* of the [window] *sash* and with the *associated* releasable stop [member] *means* positioned near the upper extremity [of] *in* the *jamb* channel short of the full height of the window casing with the stop [member] *means* being in a retracted position such that the sash may move to the full height of the window casing with a minimum of tension of the sash [cord] *cords* and such that with the releasable stop [member] *means* projecting into the path of the balance [unit] *units* the sash will be moved away from the balance [unit] at less than [the full height or] full open position of the sash to permit the sash to be removed from the window casing at substantially full [height] *open* position.

8. The readily removable [double hung] window with balance assembly of claim 7 in which the upper sash is positioned in its associated jamb channels with [the] *each* associated balance unit positioned adjacent the same in the closed position for the upper sash and with the sash cord of [the] *each* balance unit being hooked into a slot in the side jamb such that a minimum of tension is applied to the sash cord with the sash in the upper position and a maximum with the sash lowered to an open position and in which the *releasable* stop [member is] *means are* positioned in the jamb *channels* short of the full height of the window casing and normally retracted such that the [window] *sash* may be closed with the balance [assembly] *assemblies* engaging the sash, and in which the releasable stop *means* [member] when projected will engage the balance [member] *units* for the upper window sash short of the full closed position to permit the sash to be removed away from the balance [unit] *units* in the full closed position to permit removal of the sash from the window casing.

9. The readily removable [double hung] window with balance assembly of claim 5 in which the releasable stop means *for each balance unit* is a bent flange member positioned at one extremity in a slot in the [window] jamb *channel* and with an L-shaped bend at the other extremity positioned through a second slot such that a portion of the member overlies the slot to permit pivoting of the member in the first named slot between substantial parallel position with *respect to* the jamb *channel* to a projecting stop position with the jamb *channel*.

References Cited

The following references, cited by the Examiner, are of record in the patented file of this patent or the original patent.

UNITED STATES PATENTS

| | | | |
|---|---|---|---|
| 3,114,178 | 12/1963 | Wood | 49—446 |
| 3,290,825 | 12/1966 | Adams | 49—446 |

J. KARL BELL, Primary Examiner

U.S. Cl. X.R.

49—453

UNITED STATES PATENT OFFICE
CERTIFICATE OF CORRECTION

Patent No. RE 27,135 Dated June 1, 1971

Inventor(s) Dawson J. Dinsmore

It is certified that error appears in the above-identified patent and that said Letters Patent are hereby corrected as shown below:

Claim 1, Line 56, after the word "free", delete "extremely" and insert -- extremity --

Claim 6, Line 41, after the word "channels", delete "]";

" " after "are" insert -- ] --.

Signed and sealed this 28th day of September 1971.

(SEAL)
Attest:

EDWARD M.FLETCHER,JR.
Attesting Officer

ROBERT GOTTSCHALK
Acting Commissioner of Patents

USCOMM-DC 60376-P69
U.S. GOVERNMENT PRINTING OFFICE 1969 O—366-334